C. W. McKINLEY.
SEAT CONSTRUCTION FOR VEHICLES.
APPLICATION FILED OCT. 5, 1917.
1,379,771.
Patented May 31, 1921.
2 SHEETS—SHEET 1.
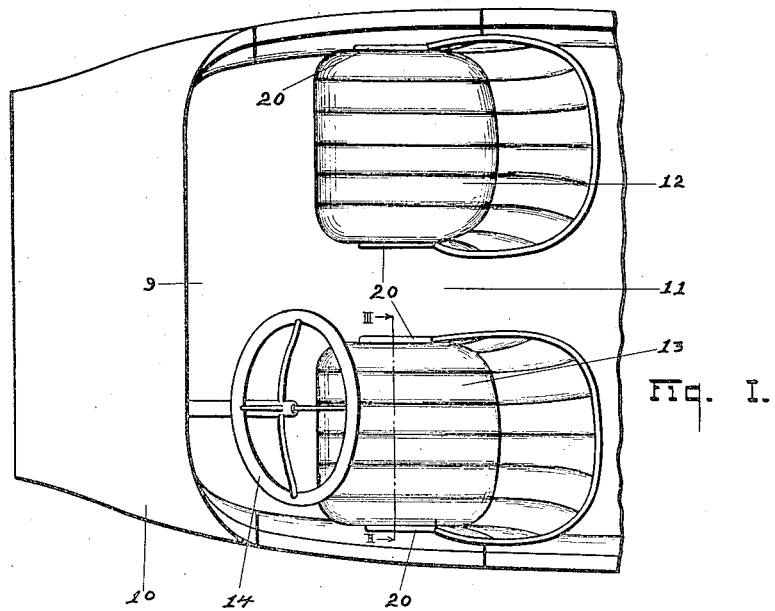
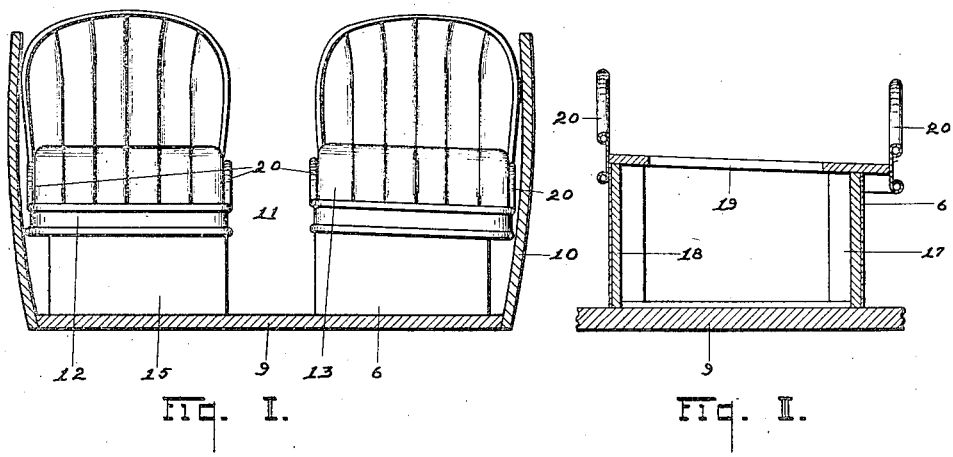
Inventor
Charles W. McKinley C. W. McKINLEY.
SEAT CONSTRUCTION FOR VEHICLES.
APPLICATION FILED OCT. 5, 1917.
1,379,771.
Patented May 31, 1921.
2 SHEETS—SHEET 2.
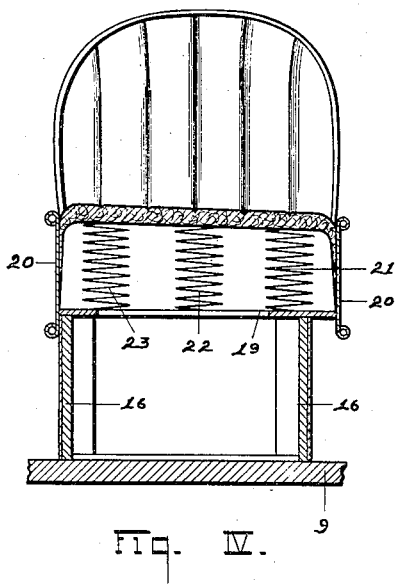
Fig. IV.
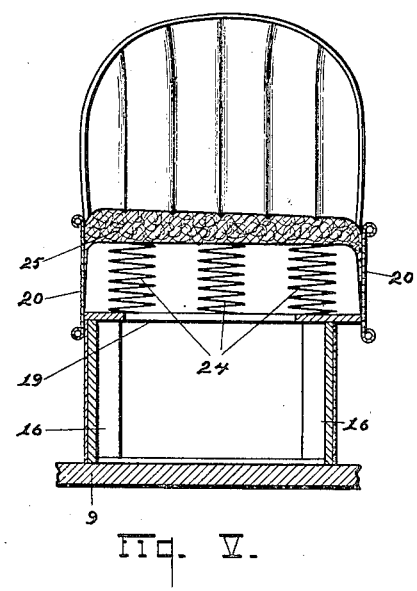
Fig. V.
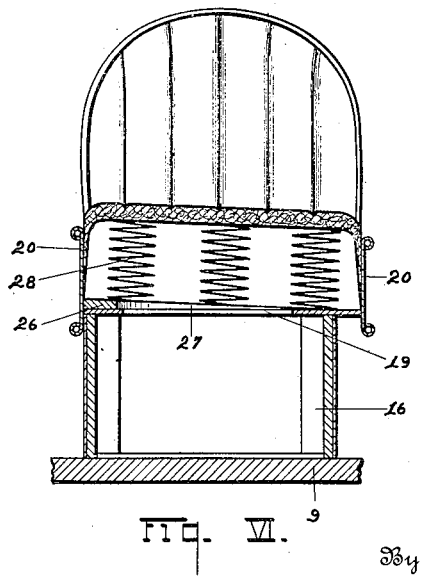
Fig. VI.
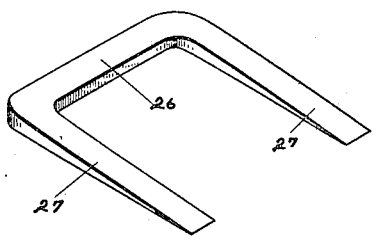
Fig. VII.
Inventor
Charles W. McKinley
By Chester H Braselton
Attorney

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

SEAT CONSTRUCTION FOR VEHICLES.

1,379,771. Specification of Letters Patent. Patented May 31, 1921.

Application filed October 5, 1917. Serial No. 194,902.

*To all whom it may concern:*

Be it known that I, CHARLES W. McKINLEY, a citizen of the United States, residing at Toledo, in the county of Lucas and State of Ohio, have invented certain new and useful Improvements in Seat Constructions for Vehicles, of which I declare the following to be a full, clear, and exact description.

This invention relates to improvements in seat construction for vehicles.

The principal object of this invention is to provide an improved seat construction for use in connection with motor vehicles, in which the driver's seat, or the seat at the left hand side of the vehicle, is inclined downwardly from the center of the vehicle toward the side thereof.

It is becoming customary in the construction of motor vehicles at the present time, to have the front seat of the vehicle divided, or separated, as in the case of a vehicle of the "clover leaf" type, affording a passage between the two front seats to the rear seat of the vehicle. The driver's seat is usually at the left hand side of the car, and, since paved or made roads slope from the center of the road toward each side, and vehicles customarily keep to the right of the road, the effect is to give an inclination to the driver's seat, if the top of it is parallel to the bottom of the car, with the result that the driver will tend to slip from his seat into the passage between the two front seats. In order to overcome this I have provided an improved seating construction in which the front, or driver's seat at the left hand side of the car, is inclined from the center of the car downwardly toward the side, so that when the car is given a slant, due to the inclination of the road, the seat becomes substantially horizontal, and this tendency to slip from the seat is overcome.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which—

Figure I is a fragmentary, top plan view of a vehicle embodying my invention.

Fig. II is a view in front elevation of the front seat of said vehicle, showing my invention embodied therein.

Fig. III is a detail, sectional view, taken on the line III—III of Fig. I.

Fig. IV is a view similar to Fig. III, but showing a modification of my invention.

Fig. V is a view similar to Fig. III and IV, but showing another modification of my invention.

Fig. VI is a view similar to Figs. III, IV, and V, but showing another modification of my invention, and Fig. VII is a perspective view of the wedge block shown in Fig. VI.

In the drawings, similar reference numerals refer to similar parts throughout the several views, and the sectional view is taken looking in the direction of the little arrows at the ends of the section line.

Considering the numbered parts of the drawing, I have shown a vehicle comprising the floor 9, the body 10, and the front seats 12 and 13, between which is the passage 11, leading to the rear seat. The steering wheel is indicated in Fig. I at 14. The right hand seat of the vehicle is mounted on the seat support 15, in the usual manner, so that the top of the seat is substantially parallel with the floor 9. The left hand seat is mounted on the seat support 6, which, as shown in Fig. III, is comprised of the side members 17 and 18, the inner side member 18 being longer than the outer side member 17, so that the top 19 of the seat support is inclined at an angle to the floor, sloping from the center of the vehicle toward the outside. The seat 13 is supported on the top 19 of the seat support in the usual manner, the usual side rail 20 for the seat being provided.

In Fig. IV, I have shown a modified form of my invention, in which the seat support 16 has parallel side members of equal length, so that the top 19 of the seat support is parallel to the floor 9. The seat is made up with a plurality of springs 21, 22 and 23, with the spring 23, which is toward the inside of the car, longer than the springs 21 and 22, and the spring 22 longer than the spring 21, so that these springs tend to slope the top of the seat from the inside toward the outside of the car.

In Fig. V, I have shown another modification of my invention, in which the springs making up the spring seat are of equal length, but the padded cushion 25, on top of the springs is padded more thickly at the inside, so that the top of the seat slopes from the inside to the outside.

In Figs. VI and VII, I have shown another modification of my invention in which the spring seat 28 is made up in the usual manner, but a wedge comprising the portion 26 and the tapered arms 27 is inserted between the spring seat 28 and the top 19 of the seat support, so as to tilt the top of the seat and cause it to slope downwardly toward the outside of the car.

Having thus described my invention, what I claim as new and desire to secure by Letters Patent, is:

1. In a vehicle, the combination of a floor board; a seat support thereon; and a seat mounted on said support, with the top thereof inclined at an angle to said board and sloping from the center of said vehicle downwardly toward the outer edge.

2. A seat construction for vehicles, comprising a seat support; and a seat carried thereby, with the top of said seat sloping downwardly from the center of the vehicle toward the outside.

3. A seat construction for vehicles, comprising the combination of a floor board; a seat support mounted thereon; and a spring seat mounted on said support and provided with springs of unequal length, the longer of said springs being disposed toward the inner edge of said seat whereby the top of said seat is inclined downwardly from the center of the vehicle toward the outside.

4. In a vehicle, a floor board, a seat positioned at one side of the center line of the vehicle, and seat supporting means certain of the inwardly positioned elements of which are of greater length than the corresponding outwardly positioned elements, whereby the said seat carried by the supporting means is inclined downwardly from the center of the vehicle toward the outer portion thereof.

5. In a vehicle, a floor board, a seat positioned at one side of the center line of the vehicle, and seat supporting means comprising a plurality of elements arranged in substantial parallelism, certain of the inwardly positioned elements being of greater length than the corresponding outwardly positioned elements whereby the said seat carried by the supporting means is inclined downwardly from the center of the vehicle toward the outer portion thereof.

6. A seat construction for vehicles comprising a plurality of supporting elements of different lengths, and a seat carried by the said elements and having its top portion sloping outwardly from the center line of the vehicle toward the outer side thereof.

7. A seat construction for vehicles comprising a frame structure, a seat support mounted thereon, a spring seat carried by said support and having one side thereof of greater thickness than the other side, whereby the top portion of the seat is inclined downwardly from the center of the vehicle toward the outer side thereof.

8. In a vehicle, a floor board, a seat support carried thereby and positioned at one side of the center line of the vehicle, a spring seat carried by said support and having one side thereof of greater thickness than the opposite side, whereby the top portion of the seat is inclined downwardly from the center of the vehicle toward the outer side thereof.

In testimony whereof I affix my signature.

CHARLES W. McKINLEY.